Nov. 29, 1927.  
W. T. LONG  
1,650,948  
PRUNING IMPLEMENT  
Filed Dec. 4, 1926  
2 Sheets-Sheet 2
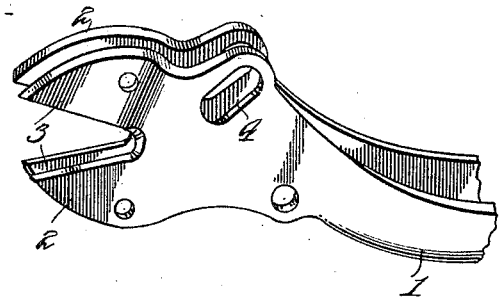
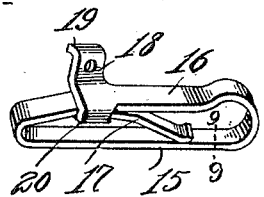 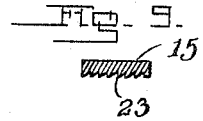
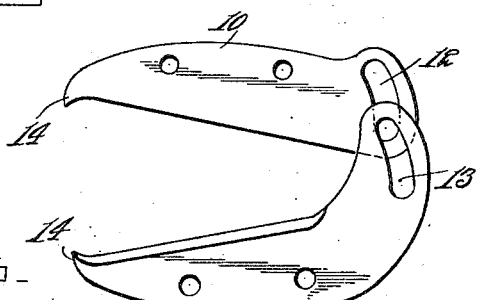
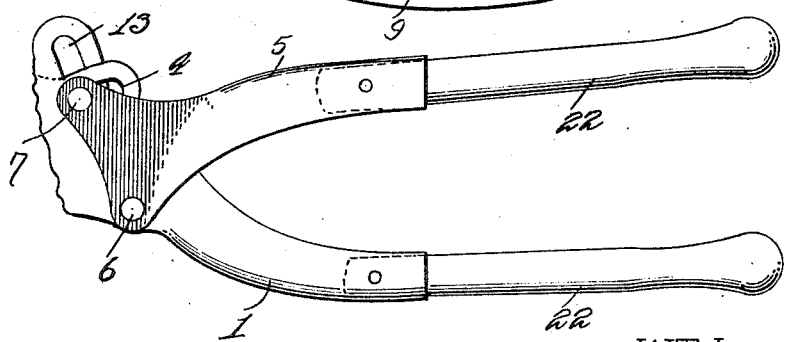
Inventor  
W. T. Long  
By Lacey & Lacey, Attorneys Patented Nov. 29, 1927.

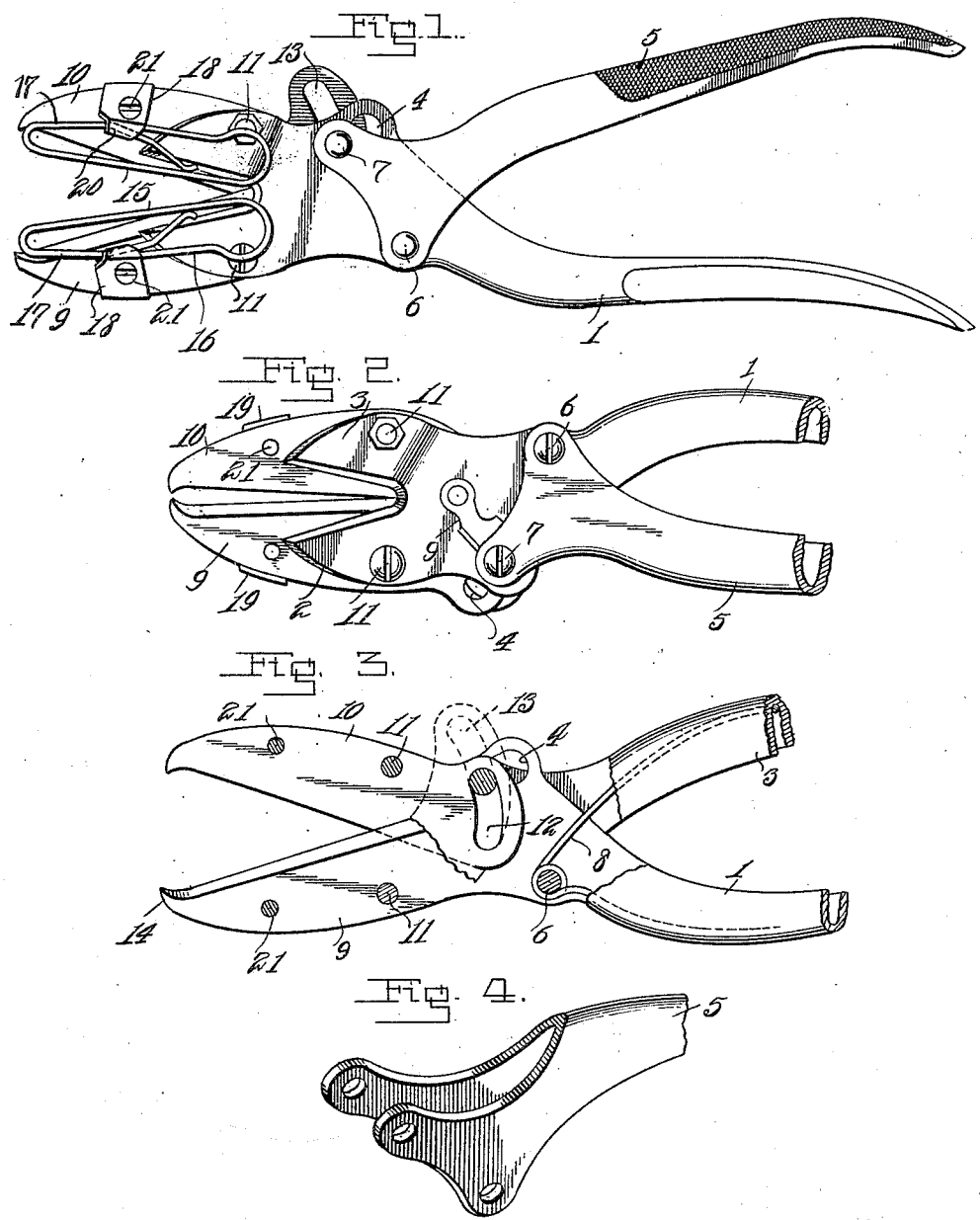

1,650,948

UNITED STATES PATENT OFFICE.

WILLIAM T. LONG, OF ORTING, WASHINGTON.

PRUNING IMPLEMENT.

Application filed December 4, 1926. Serial No. 152,636.

The invention relates to the type of devices primarily intended for pruning trees, plants and vines and combines therewith means, such as yieldable grippers, for holding the part removed and preventing its dropping upon the ground or into the tree, plant or other growth being trimmed, or from which the flower, fruit or other part is separated.

One of the main features is the provision of an implement, of the nature aforesaid, in which both blades are pivotally mounted and operate in unison and which admits of the several parts being pressed from sheet steel, consequently the device is light, strong and susceptible of being economically manufactured.

While the drawings illustrate a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof reference is to be had to the following description and the drawings hereto attached, in which,—

Figure 1 is a side view of an implement of the nature indicated, embodying the invention, showing the relation of the parts when the blades are separated.

Figure 2 is a reverse view, the blades being closed and portions of the handles omitted.

Figure 3 is a view similar to Figure 2, the implement being reversed, and portions of the handle members and one of the blades being broken away.

Figure 4 is a detail perspective view of the front portion of one of the handle members.

Figure 5 is a similar view of the companion handle member.

Figure 6 is a detail perspective view of one of the grippers.

Figure 7 is a detail view of the blades arranged opposite each other and spaced apart a distance greater than that which they occupy in the finished article.

Figure 8 is a detail view showing a modification adapting the implement for use as shears for trimming hedges.

Figure 9 is a sectional detail of the gripping portion of a holder on the line 9—9 of Figure 6.

Corresponding and like parts are referred to in the following description and designated in the several views of the drawings by like reference characters.

The implement comprises companion blades which are pivotally mounted for independent movement, and co-acting handle members, one of which pivotally supports the blades, and the other having connection with the blades to effect a simultaneous pivotal movement thereof. The handle members are of similar formation, that is, each member is pressed into the required shape from sheet steel and is hollow and arranged so that the hollow sides of the members face inwardly in the completed implement. The forward portion of each handle member is cut through whereby to provide like spaced portions to admit of compact arrangement of the parts when assembled.

The numeral 1 designates the main handle member and its front end is widened and forked, the furcations being designated by the numerals 2 and 3. A slot 4 is formed in a side portion of the enlargement in rear of the fork and inclines relatively to the length of the member. As hereinbefore stated the front portion of the member comprises similar spaced parts between which the blades are located and pivoted. The blades overlap and in order to accommodate them companion fork members are laterally offset. The furcations 2 and 3 comprising each fork member are spaced apart a distance to receive a blade which is pivoted therebetween. The furcations 2 are flush with the outer side of the member 1, whereas the furcations 3 are offset inwardly toward the furcations 2, whereby provision is had for adapting the fork members to the blades when the implement is assembled.

The handle member 5 is of a less length than the member 1 and its front end is widened and comprises spaced parts, between which the member 1 is received, a suitable pivot 6 connecting the members and passing through registering openings formed in the spaced parts thereof. The pivot 6 extends through one end of the widened portion of the member 5 and the opposite end of said widened portion receives a machine screw 7 or like part, which passes through the inclined slot 4 in the widened end portion of the member 1. A spring 8 is coiled about the pivot 6 and its end portions engage the inner hollow sides of the members 1 and 5 to normally force them apart and hold the blades separated or in open position. A catch 9 pivoted to a side of the member 1 is adapted to engage the end of the member 5 receiving the element 7, whereby to hold the handle ends of the members 1 and 5 pressed inwardly and the blades closed, as indicated most clearly in Figure 2. When the implement is adapted for service the catch 9 is turned to clear the member 5, thereby permitting free action of the spring 8 to press the handle ends of the members 1 and 5 apart and maintain the blades separated or in open position.

The blades 9 and 10 are pivotally mounted between the furcations 2 and 3 of the fork members at the front end of the member 1 and operate in substantially the same manner as the blades of shears. The pivots 11 passed through registering openings formed in the blades and the furcations 2 and 3 preferably consist of bolts, the heads of which are countersunk in the furcations 2 and the nuts being located in contact with the furcations 3. The blade 10 is substantially straight, and is formed in its rear end with a transverse slot 12 through which the element 7 passes. The blade 9 has its rear end curved towards the blade 10 and formed with a slot 13 through which the element 7 passes. It will thus be understood that the screw or analogous element 7 carried by one end of the widened portion of the member 5 passes through the slots 4, 12 and 13 and upon oscillating the handle member 5 the blades 9 and 10 receive a pivotal movement in substantially the same manner as shear blades when operated. The slot 4 formed in the widened portion of the member 1 extends in a direction corresponding approximately to an arc struck from the pivot 6 as a center. As the member 5 is oscillated the pin 7 is moved back and forth in the slot 4 and actuates the blades 9 and 10 to effect an opening and a closing thereof, as will be readily appreciated. The extremities of the blades 9 and 10 are deflected inwardly to form hooked points which prevent the cutting from slipping from between the blades when the latter close to separate the cutting from the tree, plant or the like to be pruned or separated from the part to be removed.

Means are provided for holding the part when cut and for convenience, these means are mounted directly upon the blades to move therewith, whereby to close upon the part to be removed to grip the same and to release said part when the blades open. The holder comprises similar grippers which are yieldable to compensate for different sizes of the part to be gripped. In the preferable construction each gripper is formed from a strip of spring metal comprising a jaw 15, a shank 16, a recurved end portion 17, and a lateral ear 18 terminating in an offstanding flange 19. A lip 20 projects laterally from the shank 16 towards the jaw 15 and is adapted to engage the outer edge of the recurved portion 17, and sustain such jaw against outward stress. The recurved portion 17 is disposed between the shank 16 and jaw 15 and reinforces the latter when yielding to accommodate a stem, twig, or the like of large size. The gripper extends along a side of the blade and the fork member to which the blade is pivoted, and is free to yield, being spaced a short distance from the blade and fork member so as not to interfere with the action of the blade and to move freely when yielding. The ear 18 is placed against a side of the blade and is secured thereto by means of a screw or analogous fastening 21 passing through an opening in the ear and entering a threaded opening formed in the blade. The flange 19 engages the outer edge of the blade and prevents turning of the gripper about the single fastening 21. It is observed that the grippers move with the blades, hence close upon and grip the part to be removed prior to the severing of such part from the tree, plant, vine, or other growth.

When the implement has the grippers removed it is adapted for use in substantially the same manner as ordinary pruning shears. With the grippers in place, the implement is adapted for use as a fruit picker for retaining and holding the fruit after the same has been severed from the tree or vine. The implement may also be used for picking flowers which are held and cut from the plant by one and the same operation, one hand of the operator being free to receive and gather the flowers as they are cut. The implement will be provided in various sizes to meet different demands and when adapted as shears for trimming hedges handles 22 will be fitted to the members 1 and 5, as indicated most clearly in Figure 8, it being understood that the blades and cooperating parts will be of a size to meet the requirements of hedge trimming shears.

The recurved portion 17 is bowed away from the jaw 15 and touches the end of the shank in line with the ear 18 and lip 20 and equalizes the pressure of the jaw when gripping the stem or like article. The middle portion of the part 17 is always in contact with the shank 16 and the extremity thereof is curved and in contact with the inner face of the jaw. The gripping faces of the jaws 15 are toothed or corrugated, as indicated at 23, to prevent slipping and insure a firm grip of the article to be held.

Having thus described the invention, I claim:

1. A pruning implement comprising a member having a slot adjacent a side of its front portion, a companion member having its front end widened and pivoted to the opposite side of the first mentioned member, a pin carried by the opposite end of the widened portion of the pivoted member and passing through the said slot, and blades pivoted intermediate their ends to the first mentioned member and having their rear ends overlapping and slotted to receive the pin carried by the said pivoted member.

2. A pruning implement comprising a member having a slot adjacent a side of its front portion, a companion member having its front end widened and pivoted to the opposite side of the first mentioned member, a pin carried by the opposite end of the widened portion of the pivoted member and passing through the said slot, blades pivoted intermediate their ends to the first-mentioned member and having their rear ends overlapping and slotted to receive the pin carried by the said pivoted member, and a catch pivoted to a side of the first mentioned member and adapted to engage the widened end of the pivoted member carrying the said pin, whereby to hold the blades in closed position and the rear ends of the said members pressed together.

3. A pruning implement comprising a main member having its front end widened and forked, and provided with a slot, a second member having its front end widened and pivoted at one end of the widened portion of the main member, a pin projecting through the slot in the widened end of the main member and carried by the widened end of the pivoted member and blades pivoted intermediate their ends to the forked members and having their rear ends overlapping and slotted to receive the pin carried by the widened end of the pivoted member.

4. A pruning implement comprising a main member having its front end widened, forked and slotted and comprising corresponding spaced portions, the furcations of the fork members being laterally offset, a second member having its front end widened and comprising corresponding spaced portions receiving there-between the main member and pivoted thereto at one end of the widened portion, a pin carried by the opposite end of the widened portion and passing through the slots of the main member and the blades disposed between the furcations of the fork members and pivoted intermediate their ends thereto, and having their rear ends overlapped and slotted to receive the pin carried by the widened end of the pivoted member.

5. A pruning implement comprising pivoted members and cooperating blades, of a yieldable holder comprising cooperating grippers, each including a jaw, a shank and an attaching ear, said jaw having a recurved portion forming a reinforcement disposed between the jaw and shank, and a lip projecting from the latter to engage the outer edge of the recurved reinforcement.

6. In a pruning implement, the combination with companion pivoted members, and cooperating blades, of a yieldable holder comprising spring grippers, each including a jaw, a recurved reinforcement, a shank, a lip projecting from the shank to engage the outer side of the recurved reinforcement, an ear attached to a side of the blades, and a flange overlapping the outer edge of the blades to prevent turning of the gripper upon the single fastening.

In testimony whereof I affix my signature.

WILLIAM T. LONG. [L. S.]